United States Patent Office.

HENRY REDHEAD AND GEORGE WILLIAM EMMERSON, OF NEWCASTLE-UPON-TYNE, ENGLAND.

COMPOSITION FOR MAKING TIGHT JOINTS.

SPECIFICATION forming part of Letters Patent No. 616,560, dated December 27, 1898.

Application filed December 27, 1897. Serial No. 663,793. (No specimens.)

*To all whom it may concern:*

Be it known that we, HENRY REDHEAD and GEORGE WILLIAM EMMERSON, subjects of the Queen of Great Britain, residing at Newcastle-upon-Tyne, England, have invented a certain new or Improved Composition for Making Tight Joints and for Similar Purposes or as a Preservative or an Antifouling Paint, (for which we have obtained Letters Patent in Great Britain, No. 26,673, dated November 24, 1896,) of which the following is a specification.

This new or improved composition is intended to be used instead of red or white lead and similar materials or substances for making tight steam, water, gas, and other joints of pipes, cylinders, manhole-covers, and the like and any surfaces that require to be firmly fixed together so as to be waterproof, dust-proof, or air-proof. Reduced with boiled oil to the consistency of paint it can be used as an anticorrosive wash for boiler-bottoms, inside furnaces, engine-seatings, shaft-alleys, insides and tops of tanks, coal-bunkers, and inside ship's skin, iron bridge and girder work, and all engineering purposes. With the addition of poisonous matter it is also suitable for use as an antifouling composition for immersed portions of the surfaces of ships, boats, and the like.

The composition consists of Portland, Roman, or similar cement, Venetian red or brick-dust of any kind, boiled linseed-oil or cotton-seed oil or other vegetable or animal oil, litharge or other oxid of lead, and chalk or whiting. All the solids are ground or reduced to a very fine powder and mixed with the oil. Any kind of brick may be used for reducing to dust. By altering the quantity of oil the consistency of the mixture is regulated to suit various purposes and applications.

The proportions of the ingredients for general use are preferably as follows: cement, fifty parts; boiled oil, twenty parts; Venetian red or brick-dust, ten parts; litharge, five parts; chalk, fifteen parts; total, one hundred parts.

A little variation in the different quantities used in the mixture will not materially change the character of the resulting compound. We therefore do not confine ourselves to the exact proportions above given, but may vary them, so long as the resulting compound is not materially different in its general nature and action from the compound which is the result of the proportions given.

What we claim is—

1. The composition of matter consisting of cement, boiled oil, Venetian red and oxid of lead and chalk substantially in the proportions hereinbefore described.

2. The composition of matter consisting of cement, boiled oil, Venetian red, litharge and chalk substantially in the proportions hereinbefore described.

In witness whereof we have signed this specification in presence of two witnesses.

HENRY REDHEAD.
GEORGE WILLIAM EMMERSON.

Witnesses:
H. NIXON,
W. H. NIXON.